United States Patent

Fujii et al.

[11] Patent Number: 5,128,090
[45] Date of Patent: Jul. 7, 1992

[54] PROCESS AND APPARATUS FOR VACUUM FORMING

[75] Inventors: Tetsuya Fujii, Nishikasugai; Toru Kai, Inazawa; Akiyoshi Nagano, Ama; Toshihiko Mori, Nagoya, all of Japan

[73] Assignee: Toyoda Gosei Co., Ltd., Nishikasugai, Japan

[21] Appl. No.: 625,051

[22] Filed: Dec. 10, 1990

[30] Foreign Application Priority Data

Dec. 11, 1989 [JP] Japan .................................. 1-320857

[51] Int. Cl.$^5$ .................... B29C 67/12; B29C 51/10
[52] U.S. Cl. ............................ 264/511; 264/257; 264/571; 425/504; 425/112; 425/388
[58] Field of Search ............... 264/510, 511, 512, 549, 264/553, 564, 570, 571, 101, 102, 257, 258; 425/500, 502, 503, 504, 111, 112, 123, 388

[56] References Cited

U.S. PATENT DOCUMENTS

| | | | |
|---|---|---|---|
| 4,116,736 | 9/1978 | Sanson et al. | 425/388 |
| 4,276,346 | 6/1981 | Bramwell | 264/257 |
| 4,327,052 | 4/1982 | Sauer | 264/550 |
| 4,381,278 | 4/1983 | Ingraffea | 264/545 |
| 4,801,347 | 1/1989 | Garwood | 264/512 |

Primary Examiner—Jay H. Woo
Assistant Examiner—Jeremiah F. Durkin, II
Attorney, Agent, or Firm—Cushman, Darby & Cushman

[57] ABSTRACT

A vacuum forming process, and an apparatus for carrying out the same, for imparting a predetermined shape to a sheet material. The process includes the steps of placing a thermally softened sheet material onto a molding surface of a mold and evacuating air remaining between the molding surface of the mold and the sheet material, thereby bringing the sheet material into a close contact with the molding surface of the surface of the mold. The vacuum forming process and apparatus is adapted for giving a predetermined shape to a sheet material having a low elongation ratio. In particular, when giving a predetermined shape to the sheet material, part of the sheet material is pressed with a pressing member against the molding surface of the mold, a peripheral portion of the sheet material is held with a holding member, and holding forces exerted by a plurality of holding portions of the holding member are varied in order to control movement amounts of the sheet material resulting from a pressing force of the pressing member. In this manner, a predetermined shape can be given to a sheet material without causing wrinkles thereto, even when the sheet material has a low elongation ratio.

8 Claims, 4 Drawing Sheets

PROCESS AND APPARATUS FOR VACUUM FORMING

BACKGROUND OF THE INVENTION

1. Field of the Invention

The present invention relates to an apparatus and a process for vacuum forming a material into a predetermined shape. The present invention is most suitable for giving a predetermined shape to a sheet material, such as woven fabric or the like, which has a low elongation ratio.

2. Description of the Related Art

A lid of an automobile console box, for example, includes an armature made of a resin and a sheet coated on a surface of the armature. When manufacturing the lid of the console box, a predetermined shape is given to the sheet in advance by a vacuum forming process, and the sheet thus shaped is then coated on, and fixed integrally to, the resin armature.

In a conventional vacuum forming process, a sheet material is heated to a predetermined thermal deformation temperature range, and pressed onto a molding surface of a mold. At this moment, air remaining between the molding surface of the mold and the sheet material is evacuated through air vent holes, disposed in the molding surface of the mold, by a vacuum source. In this way, the sheet material is brought into close contact with the molding surface of the mold, and shaped in conformance with the molding surface of the mold.

When the sheet material is made of a thermoplastic resin, such as polyvinylchloride (PVC), an acrylonitrile-butadiene-styrene (ABS), or a polypropylene (PP), the sheet material can be easily shaped into a predetermined shape by the conventional vacuum forming process. In addition, a sheet material made of a knitted or non-woven fabric material can be easily formed into a predetermined shape, because such a material has a relatively high elongation ratio (plastic deformation). However, when the sheet material is formed of woven fabric, or the like, with a low elongation ratio, wrinkles often occur on the portions of the sheet material proximate to the corner portions of the molding surface of the mold as illustrated in FIG. 7. Thus, it has been difficult, or impossible, to give a predetermined shape to a sheet material made of woven fabric, or the like, by conventional vacuum forming processes. Hence, when making a sheet from woven fabric or the like, the woven fabric must be cut into a predetermined development shape and sewn together, thereby requiring extensive labor and high cost.

SUMMARY OF THE INVENTION

It is an object of the present invention to give a predetermined shape to a sheet material, by a vacuum forming process, without causing wrinkles on the portions of the sheet material proximate to the corner portions of the molding surface of the mold even when the sheet material has a low elongation ratio, such as a woven fabric or the like. It is an additional object of the invention to provide an apparatus for performing the above-mentioned process.

BRIEF DESCRIPTION OF THE DRAWING

A more complete appreciation of the present invention and many of its advantages will be readily obtained as the same becomes better understood by reference to the following detailed description when considered in connection with the accompanying drawings and detailed specification, all of which form a part of the disclosure.

DETAILED DESCRIPTION OF THE INVENTION

Figure 1:
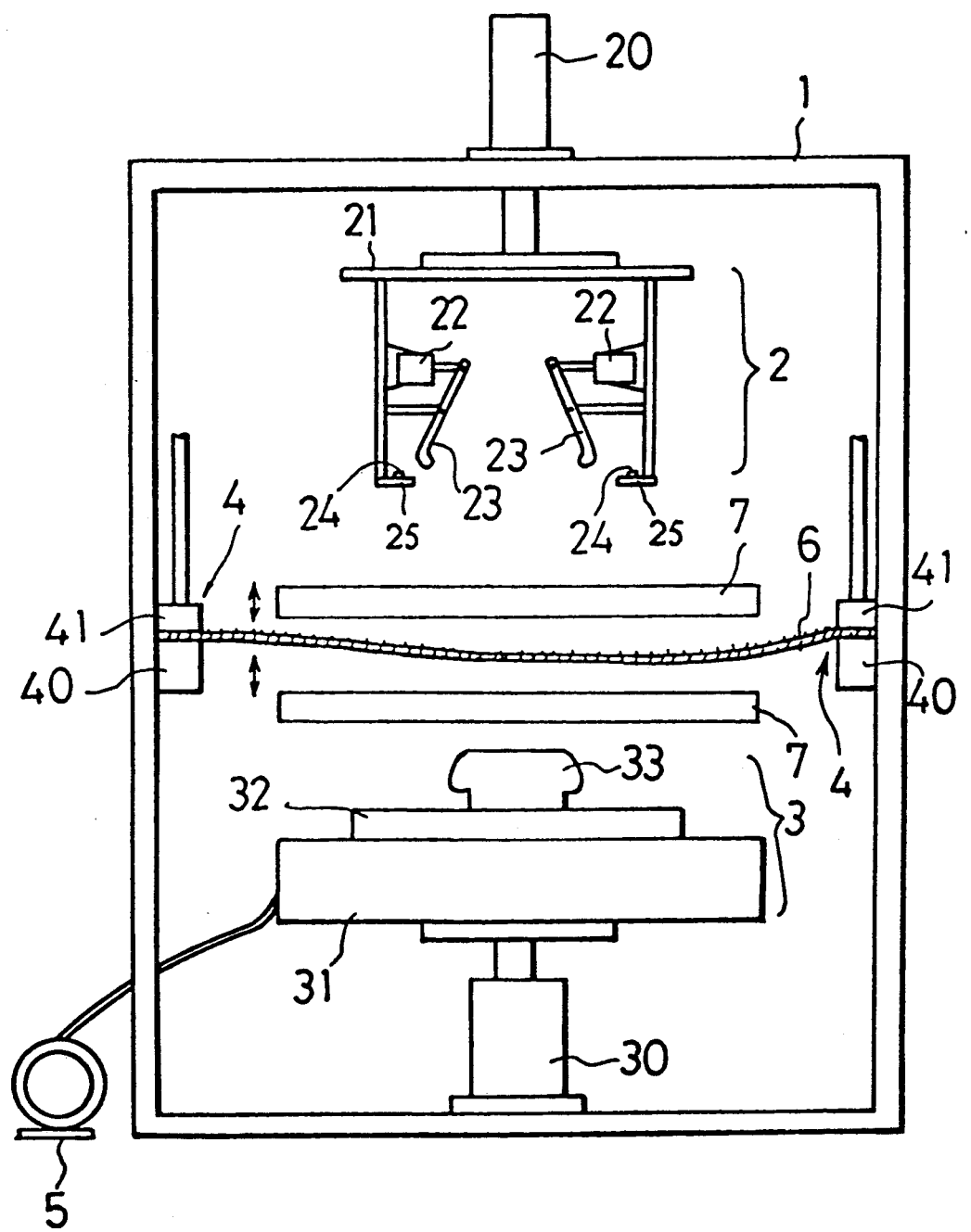
FIG. 1 is a side view of the preferred embodiment illustrating a vacuum forming apparatus of the present invention.

The present invention is a vacuum forming process for giving a predetermined shape to a sheet material having a low elongation ratio and an apparatus for carrying out this process. The process includes heating the sheet material to a thermal deformation temperature range, evacuating air remaining between a molding surface of a mold and the heated sheet material, thereby giving a predetermined shape to the sheet material, while simultaneously pressing part of the sheet material with a pressing member against the molding surface of the mold. At the same time, a peripheral portion of the sheet material is held with a holding member, and holding forces exerted by a plurality of holding portions of the holding member are varied in order to control movement of the peripheral portion of the sheet material resulting from the force of the pressing member. Subsequently, the sheet material is cooled and separated from the molding surface of the mold.

By way of definition, a low elongation ratio is a tensile elongation ratio of approximately 50% or less. In the case of a sheet material with a tensile elongation ratio of more than approximately 50%, the advantages of the present invention may not be fully apparent, since a predetermined shape may be given to such a sheet material by the conventional vacuum forming process without substantial wrinkling. Fabrics are the most common sheet material having a low elongation ratio. In order to maintain a predetermined shape, a sheet material is usually employed which has a backing layer made of a thermoplastic foamed substance, or the like, integrally laminated on one surface of the woven fabric.

The first step is heating the sheet material to a thermal deformation temperature range. Here, the sheet material is heated to at least the thermal deformation temperature of the backing layer material since the sheet material is typically composed of a woven fabric with a backing layer made of a thermoplastic resin.

One of the novel aspects of the present invention lies in the second step and the unique structure utilized to carry it out. In the second step, the peripheral portion of the sheet material is held in a manner so that the movement thereof is controllable at the peripheral portion of the sheet material. It is preferable to be able to control the force for holding the peripheral portion. For instance, as set forth in a preferred embodiment hereinafter described, the sheet material may be held between the molding surface of the mold and the front ends of bolts which are disposed in a frame plate. The force for holding the peripheral portion of the sheet material may be controlled by adjusting the lengths of the bolts protruding from the frame plate.

As described above, the sheet material is held in a manner so that the movement of the peripheral portion thereof is controllable and part of the peripheral portion thereof is pressed against the molding surface of the mold. It is preferred to press the particular portions of the sheet material to be brought into contact with the corner portions of the molding surface of the mold, where wrinkles are most likely to occur. Further, various conventional means for pressing may be employed.

In the process for vacuum forming according to the present invention, the sheet material is heated to the terminal deformation temperature range, and it is softened. The heated and softened sheet material is pressed onto the molding surface of the mold. At this moment, air remaining between the molding surface of the mold and the sheet material is evacuated through air vent holes, disposed in the molding surface of the mold, by a vacuum source. However, in a conventional process, the sheet material will not conform with the configuration of the molding surface of the mold, if the sheet material has a low elongation ratio.

On the other hand, in the process for vacuum forming according to the present invention, the peripheral portion of the sheet material is held in a manner so that the movement of the peripheral portion of the sheet material is controllable, and part of the peripheral portion thereof is pressed against the molding surface of the mold. Accordingly, the thusly held peripheral portion of the sheet material is pressed onto the molding surface of the mold by the pressing force. Therefore, it is possible to prevent the wrinkles from occurring by controlling the pressing force and the movement of the peripheral portion of the sheet material resulting from the pressing.

In other words, the movement of the peripheral portion of the sheet material, pulled heavily by the vacuum attraction and by the pressing force, is allowed to a great degree, and the movement of the peripheral portion thereof subjected to less tensile force is allowed only to a lesser degree. In this manner, the resulting wrinkles are small since the sheet material can be brought into close contact with the molding surface of the mold without the use of excessive force. In addition, any small wrinkles that have occurred, can be further reduced by the pressing force.

Therefore, a predetermined shape can be easily given to a sheet material, such as a woven fabric, or the like, having a low elongation ratio by the process and apparatus for vacuum forming according to the present invention. Accordingly, the degree of freedom has been improved in the selection of sheet material, and designs which have been previously considered undesirable may be easily manufactured by the process for vacuum forming. As a result, the design flexibility of an automobile console box lid, or the like, has been improved. In addition the labor requirement for the manufacture of such articles has been reduced.

DETAILED DESCRIPTION OF THE PREFERRED EMBODIMENT

Having generally described the present invention, a further understanding can be obtained by reference to the specific preferred embodiment which is provided herein for purposes of illustration only and not intended to limit the scope of the appended claims.

FIG. 1 illustrates a vacuum forming apparatus of the preferred embodiment. This vacuum forming apparatus comprises main body 1, plug unit 2 disposed in main body 1, mold unit 3 also disposed in main body 1, clamping units 4 for holding a sheet material in main body 1, and vacuum pump 5.

Plug unit 2 includes first cylinder 20 fixed on main body 1, installation frame 21 fixed on a piston rod of first cylinder 20, a plurality of plug driving cylinders 22 fixed on installation frame 21, a plurality of plugs 23 held swingably on piston rods of plug driving cylinders 22, and control bolts 24 disposed in frame plate 25. Frame plate 25 is affixed to the front end of installation frame 21.

Mold unit 3 includes second cylinder 30 fixed on main body 1, vacuum box 31 fixed on a piston rod of second cylinder 30, fixed plate 32, and male vacuum mold 33. Finally, the clamping units 4 include base portions 40 fixed on main body 1, and pressing portions 41 movable in the vertical direction away from base portions 40.

Vacuum box 31 communicates with vacuum pump 5, and the inside of vacuum box 31 communicates with the inside of main body 1 via a plurality of vent holes (not shown) formed in male vacuum mold 33. Thus sheet material 6 can be attracted on the molding surface of male vacuum mold 33.

Figure 3:
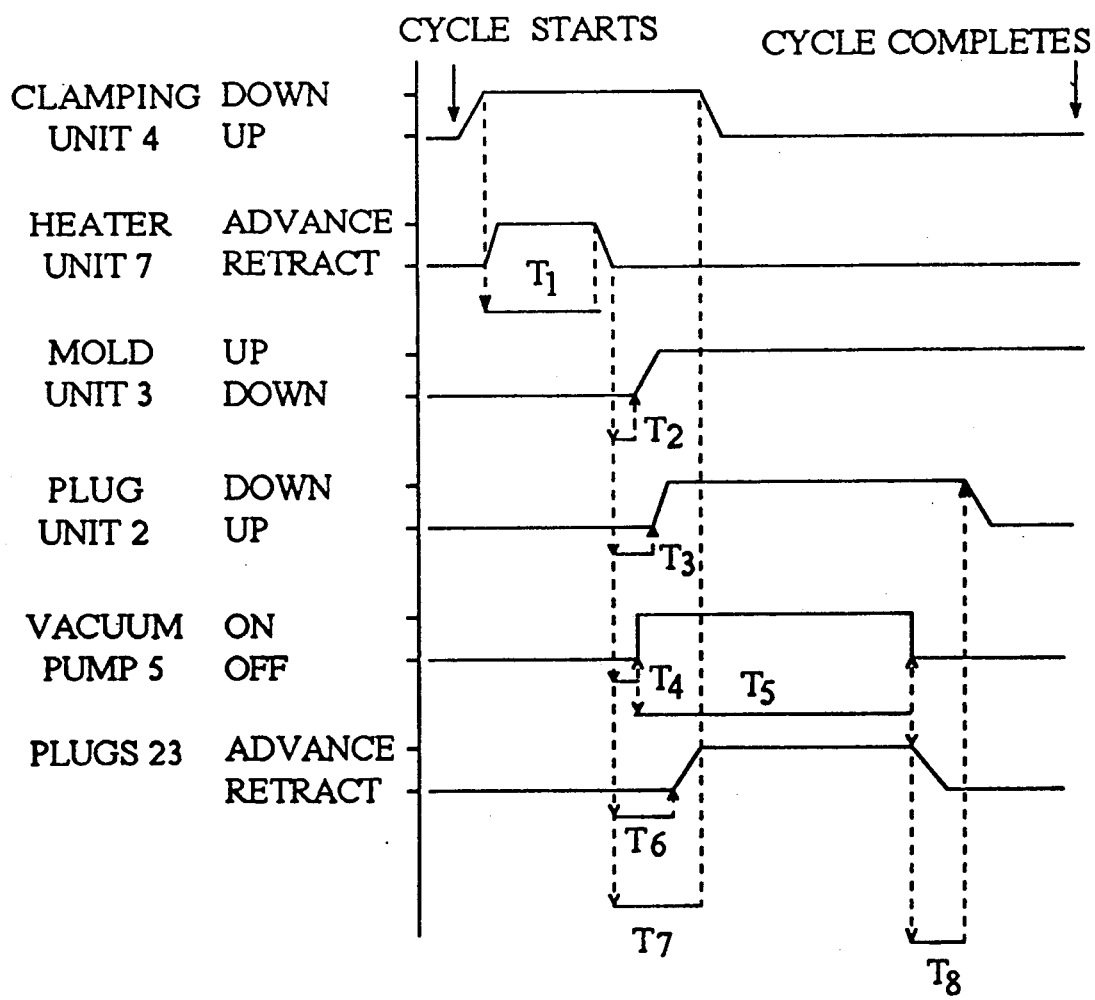
FIG. 3 is a timing chart illustrating how the vacuum forming process, with units of time disposed along the X-axis, and the actuating event disposed along the Y-axis is carried out by the preferred embodiment.

The vacuum forming apparatus thusly constructed was employed in a process for forming a console box lid. The process is described below with reference to the timing chart illustrated in FIG. 3.

Figure 2:
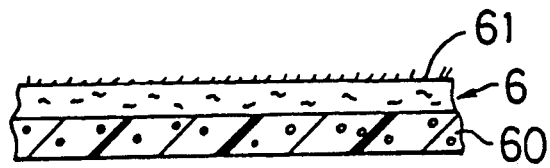
FIG. 2 is a cross sectional view illustrating a sheet material to be formed by the preferred embodiment.

Before carrying out the process, sheet material 6, having a construction as illustrated in FIG. 2 was prepared. Sheet material 6 includes fabric layer 61 formed of moquette, and backing layer 60 formed of a foamed polypropylene resin and bonded on the fabric layer 61 by a laminating process. Sheet material 6 may be constructed of any material or combination of materials suitable for vacuum molding. Sheet material 6 was held between base portion 40 and pressing portion 41 of clamping unit 4 at the peripheral portion thereof, and placed above male vacuum mold 33. The clamping force was 5 to 50 kilograms(force) for each clamping operation.

Then, sheet material 6 was heated to a temperature of 90° to 200° C. on both surfaces thereof advancing by heater unit 7 against the sheet for a time and the retracting the heater. The heating time "T1" was 10 to 70 seconds.

After heater unit 7 had been fully retracted and time "T2" had passed, second cylinder 30 was actuated to ascend male vacuum mold 33. Thus, sheet material 6 was pressed by male vacuum mold 33. After time "T4" had passed, vacuum pump 5 was actuated, thereby attracting sheet material 6 onto the molding surface of male vacuum mold 33. When attracting sheet material 6, the degree of vacuum was 20 to 70 Torr.

Figure 4:
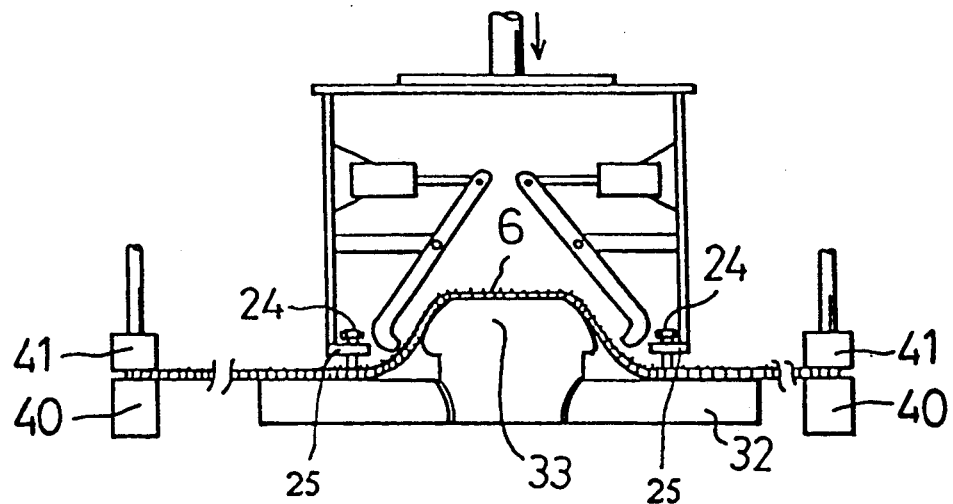
FIG. 4 is a side view illustrating a plug unit of the vacuum forming apparatus of the preferred embodiment in the course of the vacuum forming process.
Figure 5:
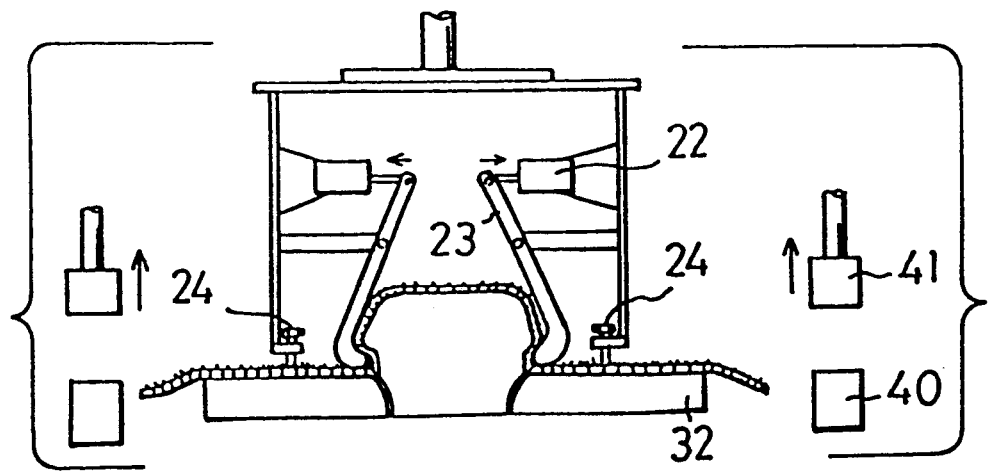
FIG. 5 is another side view illustrating the plug unit of the vacuum forming apparatus of the preferred embodiment in the course of the vacuum forming process.

Next, after time "T3" had passed from the full retraction of heater unit 7, plug unit 2 was descended and put into a state illustrated in FIG. 4. Then, after time "T7" had passed heater unit 7, pressing portion 41 was separated from the base portion 40 to free the clamping force, thereby holding sheet material 6 movably between control bolts 24 and fixed plate 32 as illustrated in FIG. 5. Slightly before sheet material 6 was freed from clamping unit 4, plug driving cylinders 22 were actuated, and the portions of sheet material 6 to be the corner portions of the console box lid were pressed onto the molding surface of male vacuum mold 33 by plugs 23.

Figure 6:
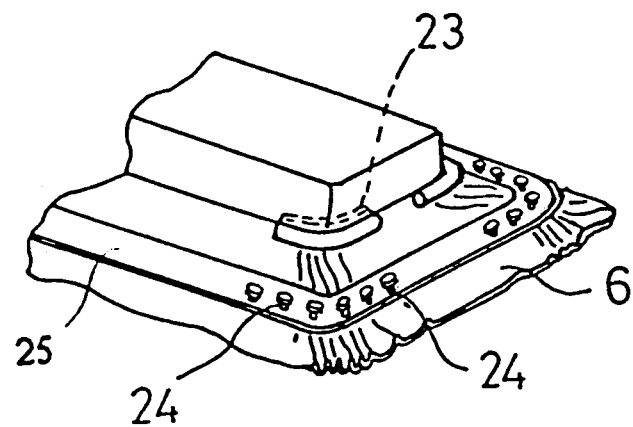
FIG. 6 is a partial perspective view illustrating major portions of the vacuum forming apparatus of the preferred embodiment in the course of the vacuum forming process.
Figure 7:
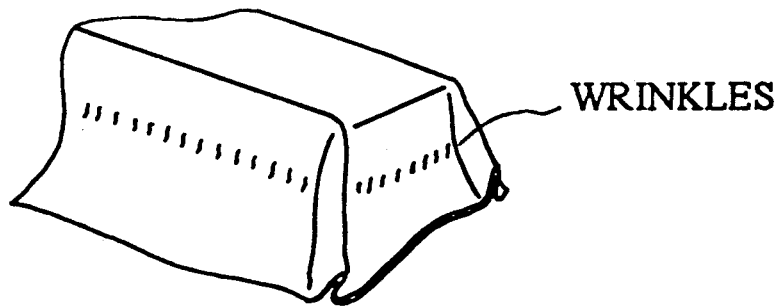
FIG. 7 is a perspective view illustrating a sheet material to which a predetermined shape is given by a conventional vacuum forming process of the prior art.

Under the above-mentioned circumstances, as illustrated in FIG. 6, a plurality of control bolts 24 were disposed in frame plate 25 along the corner portions of frame plate 25. The lengths of control bolts 24 protruding from the frame plate 25 were adjusted so that they were the shortest at the apexes of the corner portions of frame plate 25. Further, the lengths of the control bolts 24 protruding from the frame plate 25 were adjusted so as to be successively longer at positions further remote from the apexes of the corner portions of frame plate 25. Accordingly, sheet material 6 was subjected to the smallest holding force at the apex of the corners of frame plate 25 and also to gradually increasing holding forces at portions other than the apexes of the corner portions of frame plate 25. When sheet material 6 was pressed onto the molding surface of male vacuum mold 33 by plugs 23, the movement of sheet material 6 was controlled so that the movement was larger at the apexes of the corner portions of frame plate 25 and so that the movement was decreased gradually at portions remote from the apexes of the corner portions of frame plate 25. In this manner, the wrinkles were reduced on the portions of sheet material 6 corresponding to the corner portions of the console box lid, and they were further dispersed by the pressing of plugs 23. Accordingly, the wrinkles have been minimized on the portions of material 6 corresponding to the corner portions of the console box lid.

Sheet material 6 was held under above-mentioned circumstances for a period of the "T5". Thereafter, vacuum pump 5 was deactivated, and simultaneously plugs 23 were retracted. After vacuum pump 5 had been deactivated and time "T8" had passed, plug unit 2 was ascended. Finally, sheet material 6, to which a predetermined shape was imparted, was removed from male vacuum mold 33 and one cycle of the vacuum forming operation was completed.

In conclusion, in the preferred embodiment, sheet material 6 was freed from the holding of clamping unit 4 during the pressing operation, but it was held with the variable holding forces exerted by control bolts 24 at the peripheral portion thereof. Hence, it was possible to control the movement of the peripheral portion of sheet material 6. As a result, the wrinkles can be prevented from occurring even at portions having various configurations by controlling the pressing force of plugs 23 and the lengths of control bolts 24 protruding from frame plate 25 in accordance with the preferred embodiment of the present invention.

Having now fully described the present invention, it will be apparent to one of ordinary skill in the art that many changes and modifications can be made thereto without departing from the spirit and scope of the present invention as set forth herein including the appended claims.

What is claimed is:

1. A vacuum forming process for imparting a predetermined shape to a sheet material having a low elongation ratio, comprising the steps of:
heating said sheet material to a predetermined thermal deformation temperature range;
placing said sheet material in close proximity to a molding surface;
evacuating air remaining between said molding surface and said sheet material, thereby imparting a predetermined shape to said sheet material;
simultaneously pressing a portion of said sheet material with a pressing member against at least a portion of said molding surface, holding a peripheral portion of said sheet material with a holding member, and varying holding forces exerted by a plurality of holding portions of said holding member in order to control amounts of movement of said peripheral portion of said sheet material resulting from a pressing force of said pressing member; and
cooling and separating said sheet material from said molding surface.

2. The vacuum forming process of claim 1, wherein said pressing step includes exerting tensile forces on said sheet material, by said pressing member, which are opposed by said holding forces.

3. The vacuum forming process of claim 2, wherein the holding step includes holding said sheet material by a first force at a first portion thereof where said tensile force is large, and holding said sheet material by a second force at a second portion thereof where said tensile force is less than at said first portion, said second force being greater than said first force.

4. A vacuum forming process for giving a box shape to a sheet material having a low elongation ratio, comprising the steps of:
heating said sheet material to predetermined deformation temperature range;
pressing said sheet material to a box shaped molding surface have corners;
evacuating air remaining between said molding surface and said sheet material;
simultaneously pressing at least a portion of said sheet material with a pressing member against said molding surface, holding a peripheral portion of said sheet material with a holding member, and exerting varying holding forces by a plurality of holding portions of said holding member in order to control movement of said peripheral portion of said sheet material resulting from a pressing force due to said pressing member; and
cooling and separating said sheet material from said molding surface of said mold.

5. The vacuum forming process of claim 4, wherein said pressing step consists of pressing a part of said sheet material, proximate a corner of said molding surface, against said molding surface.

6. The vacuum forming process of claim 5, wherein said exerting step includes exerting a first force on said sheet material at a portion thereof opposite an apex of said corner, and exerting varying forces gradually larger than said first force to said sheet material at successive positions remote from said apex, said movement of said peripheral portion of said sheet material being a given value at said portion thereof facing said apex of said corner, and said movement of said peripheral portion of said sheet material decreasing to a value smaller than said given value at portions thereof disposed away from said apex of said corner.

7. A vacuum forming apparatus for imparting a predetermined shape to a sheet material, comprising:
- heating means for heating the sheet material to a predetermined thermal deformation temperature range;
- a mold surface;
- holding means for holding peripheral portions of the sheet material so that the sheet material is in proximity to said mold surface;
- means for evacuating air from between said mold surface and the sheet material;
- pressing means for pressing at least a portion of the sheet material against said mold surface;
- means for cooling the sheet material; and
- means for separating the sheet material from said mold surface;
- said holding means exerting a varying holding force on portions of the sheet material so as to control movement of peripheral portions of the sheet material, due to tensile forces placed upon said sheet material by said pressing means, so as to minimize wrinkles in said sheet material after it conforms to said predetermined shape.

8. A vacuum, forming apparatus as described in claim 7 wherein said holding means comprises:
- a frame plate;
- a plurality of bolts disposed in, and protruding from, said frame plate; and
- a fixed plate;
- the sheet material being secured between the ends of said bolts protruding from said frame plate and a surface of said fixed plate, the lengths of protrusion of said bolts being adjusted so as to exert predetermined forces in opposition to said tensile forces and thus control movement of peripheral portions of the sheet material in a desired fashion so as to minimize wrinkling of the sheet material after it conforms to the predetermined shape.

* * * * *